United States Patent [19]
Oura et al.

[11] Patent Number: 5,959,620
[45] Date of Patent: Sep. 28, 1999

[54] IMAGE DISPLAY APPARATUS

[75] Inventors: Koichi Oura; Susumu Tsuchida, both of Tokyo, Japan

[73] Assignee: Sony Corporation, Tokyo, Japan

[21] Appl. No.: 08/839,574

[22] Filed: Apr. 15, 1997

[30] Foreign Application Priority Data

Apr. 23, 1996 [JP] Japan ................................. 8-101450

[51] Int. Cl.⁶ .............................................. G09G 5/00
[52] U.S. Cl. ............................................................ 345/204
[58] Field of Search ................................. 345/204, 214

[56] References Cited

U.S. PATENT DOCUMENTS

| | | | |
|---|---|---|---|
| 5,285,301 | 2/1994 | Shirahashi et al. | 359/59 |
| 5,736,972 | 4/1998 | Kitagishi et al. | 345/99 |

FOREIGN PATENT DOCUMENTS

0738998A1  10/1996  European Pat. Off. ......... G09G 3/36

OTHER PUBLICATIONS

Japanese Patent Abstract, Mounting Structure of LCD Module; Publ. No. 04019617; Publ. Date Jan. 23, 1992; Inventor–Chiba Mitsuyoshi.

Japanese Patent Abstract, Wiring Connection Device and Electro–Optical Device Provided Therewith; Publ. No. 04176183; Publ. Date Jun. 23, 1992; Inventor–Maruyama Kunio.

*Primary Examiner*—Mark K. Zimmerman
*Assistant Examiner*—Ronald Laneau
*Attorney, Agent, or Firm*—Jay H. Maioli

[57] ABSTRACT

An image display apparatus, which requires individual transmission of signals to portions corresponding to a plurality of pixels or lines, such as a liquid crystal display, a plasma display and includes signal transmitting sections 4, 5 for transmitting signals to an image display section to which independent signals are applied for each pixel or line, a plurality of transmitting lines arranged parallel to each other at regular intervals are brought for each plurality of transmitting blocks. A transmitting line, serving as a dummy between transmitting lines which are located in different transmitting blocks and adjacent to each other, is disposed in any one of transmitting blocks including the adjacent transmitting lines. A transmitting line nearest to the dummy transmitting line in the other transmitting block of the transmitting blocks including the adjacent transmitting lines is electrically connected to the dummy transmitting line outside of the signal transmitting sections 4, 5.

4 Claims, 3 Drawing Sheets

IMAGE DISPLAY APPARATUS

BACKGROUND

1. Field of the Invention

The present invention relates to an image display apparatus, more particularly to an image display apparatus which requires individual transmission of a signal to a portion corresponding to a plurality of image pixels or a plurality of lines, such as a liquid crystal display, a plasma display and the like.

2. Background of the Invention

For example, in an image display apparatus which requires individual transmission of a signal to a portion corresponding to a plurality of image pixels or a plurality of lines, such as a liquid crystal display, a plasma display and the like, the transmitting parts, in which a plurality of signal lines are brought into a single element, are frequently used as a transmitting section for the above signals, as shown in FIG.1.

That is, as shown in FIG.1, the image display apparatus is provided with an image display section 11 having a display panel such as a liquid crystal and the like, a vertical drive signal generating section 12 for generating a vertical drive image signal, a horizontal drive signal generating section 13 for generating a horizontal drive image signal, a horizontal drive signal transmitting section 14 for transmitting the vertical drive image signal generated by the vertical drive signal generating section 12 to the image display section 11, and a vertical drive signal transmitting section 15 for transmitting the horizontal drive image signal generated by the horizontal drive signal generating section 13 to the image display section 11. Each of signal transmitting sections 14, 15 is provided with transmitting parts, for example, such as a flexible printed circuit board and the like, in which a plurality of transmitting lines for transmitting the drive signals to the respective pixels or lines of the image display section 11 are bundled parallel to each other at regular intervals.

In the image display apparatus having the above mentioned configuration, in a case of increasing the number of the images and making the pitch of the pixel short in order to make the image highly detailed, the pitch interval between the transmitting lines in the signal transmitting sections 14, 15 must be narrowed and the number of the transmitting lines must be increased. On this occasion, if the signal transmitting sections 14, 15 are constituted by one printed circuit board, it is necessary to improve an accuracy of the pitch interval in order to cope with the increase of the number of the transmitting lines and the decrease of the pitch interval. The improvement of the accuracy of the pitch interval may result in deterioration of the production yield of the transmitting parts used for the signal transmitting sections 14, 15. The costs of the transmitting parts are made expensive, as a result.

Then, in order to improve the production yield of the parts used for the signal transmitting sections 14, 15, the signal transmitting sections 14, 15 are divided into a plurality of transmitting blocks 14A, 14B and 15A, 15B, 15C, respectively, as shown in FIG.2.

However, in a case of dividing into a plurality of transmitting blocks the transmitting path in which a plurality of transmitting lines are bundled parallel to each other, capacitances between the adjacent transmitting lines in each transmitting block are equal, whereas capacitances between the adjacent transmitting lines located at the different transmitting blocks are different from those between the adjacent transmitting lines located in the same transmitting block. This has influence on the magnitude and phase of the signal passed though the transmitting lines before and after the transmitting blocks are switched. This results in vertical or horizontal noise on the image.

SUMMARY OF THE INVENTION

It is therefore an object of the present invention to provide an image display apparatus which resolves the above mentioned problem and improves the image quality.

An image display apparatus according to the present invention is provided with an image display section to which independent signals for each pixel or line are applied, and a signal transmission of section for parallel transmitting the signals for each pixel or line that are independent in the image display apparatus. In the signal transmitting section, a plurality of transmitting lines arranged parallel to each other at regular intervals are brought into a single element for each plurality of transmitting blocks. A transmitting line, serving as a dummy between the transmitting lines which are located at the different transmitting blocks and are adjacent to each other, is disposed in any one of the transmitting blocks including the adjacent transmitting lines. A transmitting line nearest to the dummy transmitting line in the other transmitting blocks of the transmitting blocks including the adjacent transmitting lines is electrically connected to the dummy transmitting line outside of the signal transmitting sections.

In the image display apparatus according to the present invention, the signal transmitting section transmits, in parallel, the signals for each pixel or line that is independent in the image display section. As a result, it is possible to make the capacitances between the respective transmitting lines uniform and also possible to display the image with high quality without the vertical or horizontal noise on the image. Moreover, since the signal transmitting section is divided into a plurality of transmitting blocks, it is possible for each transmitting block to thereby improve the production yield.

The nature, utility, and features of this invention will be more clearly apparent from the following detailed description with respect to preferred embodiments of the invention when read in conjunction with the accompanying drawings briefly described below.

DESCRIPTION OF THE INVENTION

Figure 3:
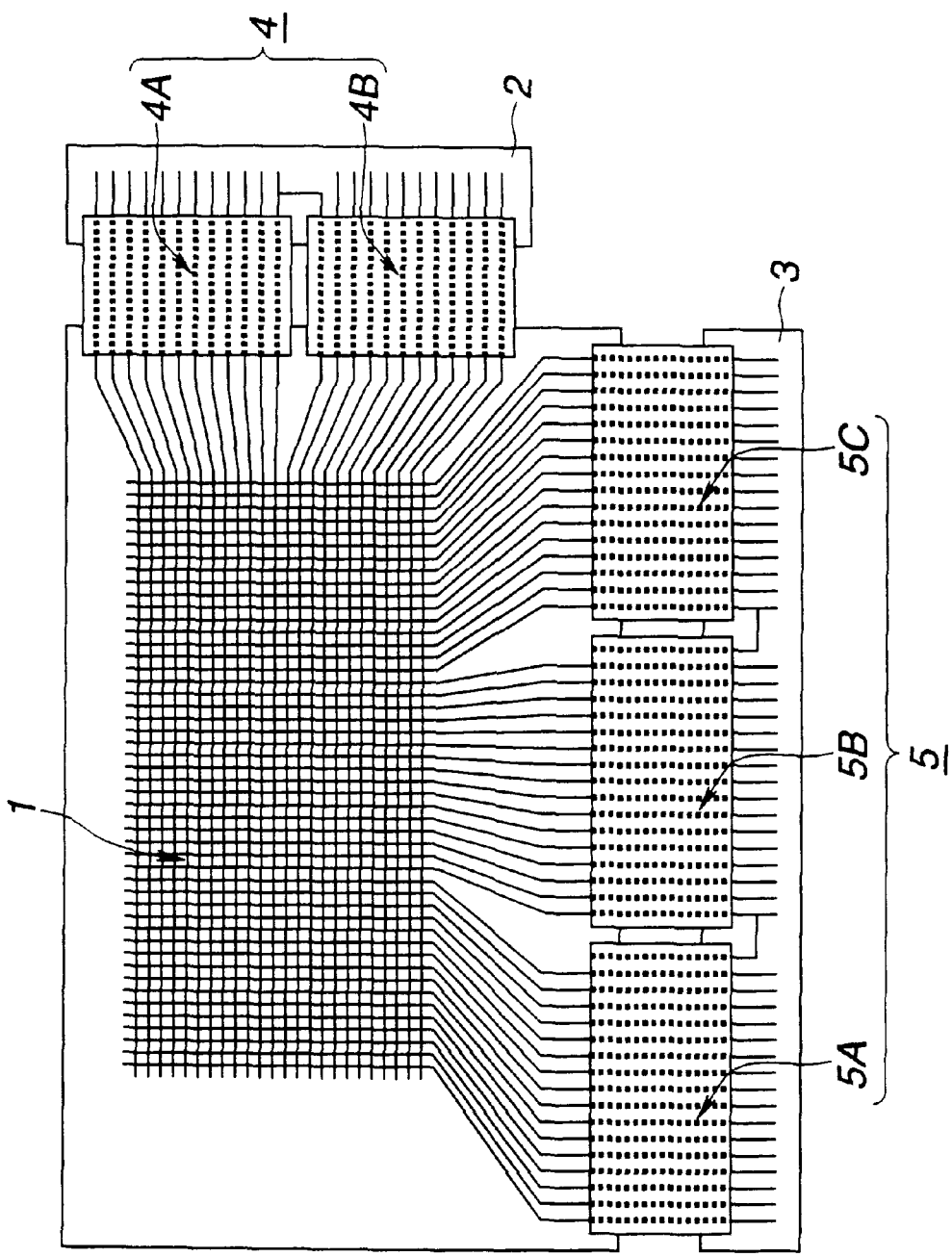
FIG. 3 is a block diagram showing a configuration of an image display apparatus according to the present invention.

FIG.3 is a view showing a configuration of an image display apparatus according to the present invention. The image display device shown in FIG.3 is provided with: an image display section 1 having a display panel, such as a liquid crystal and the like; a signal transmitting section 4 for transmitting a vertical drive image signal generated by a vertical drive signal generator 2 to the image display portion 1; and a signal transmitting section 5 for transmitting a horizontal drive image signal generated by a horizontal drive signal generator 3 to the image display section 1. Each of the signal transmitting sections 4, 5 is composed of transmitting parts, for example, such as a flexible printed circuit board and the like, in which a plurality for transmitting lines of transmitting the drive signals to respective pixels or lines in the image display section 1 are bundled parallel to each other at regular intervals. Each of the signal transmitting parts 4, 5 is divided into a plurality of transmitting blocks. At a boundary between the respective blocks, a transmitting line on one of the transmitting blocks and a dummy transmitting line disposed in the other transmitting blocks are electrically connected to each other outside of the signal transmitting sections 4, 5. More specifically, at the boundary between the respective blocks in the signal transmitting section 4, the transmitting line on one of the transmitting blocks and the dummy transmitting line disposed on the other transmitting blocks are electrically connected to each other on a printed board of the vertical drive signal generator 2. Further, at the boundary between the respective blocks in the signal transmitting section 5, the transmitting line on one of the transmitting blocks and the dummy transmitting line disposed on the other transmitting blocks are electrically connected to each other on a printed board of the vertical drive signal generator 3.

That is, in each of the signal transmitting sections 4, 5, a plurality of signal lines are brought into a single element for each plurality of transmitting blocks 4A, 4B, 5A, 5B and 5C. A transmitting line, serving as a dummy between the transmitting lines which are located at the different transmitting blocks and adjacent to each other, is disposed in any one of the transmitting blocks including the adjacent transmitting lines. A transmitting line nearest to the dummy transmitting line in the other transmitting blocks of the transmitting blocks including the adjacent transmitting lines is electrically connected to the dummy transmitting line outside of the transmitting section.

Figure 1:
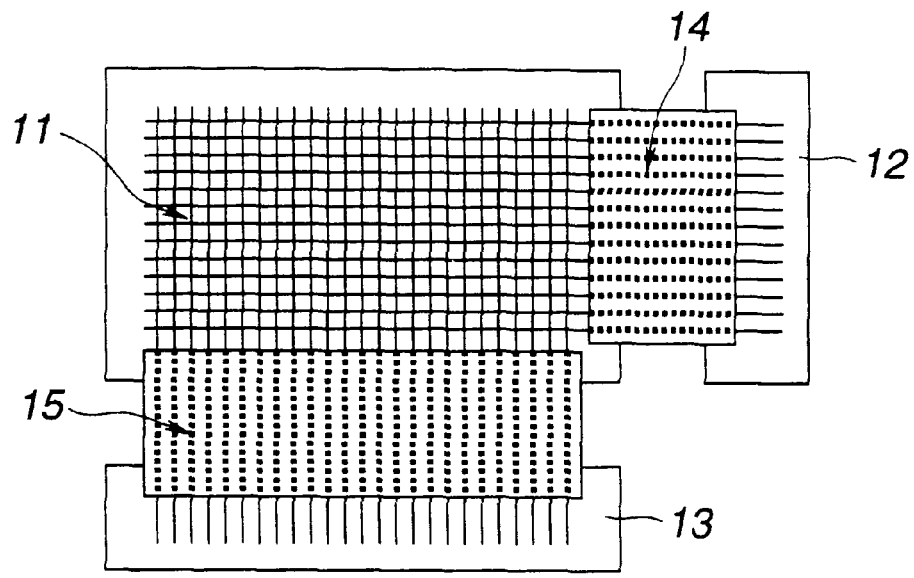
FIG. 1 is a block diagram showing a configuration of a conventional image display apparatus.
Figure 4:
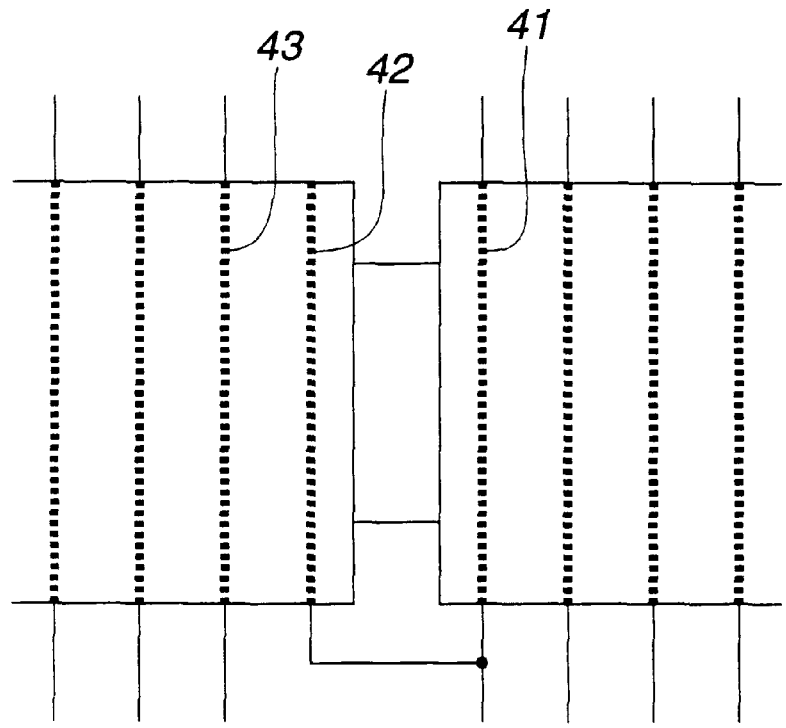
FIG. 4 is an enlarged view of a main part of the image display apparatus of FIG.3.
Figure 2:
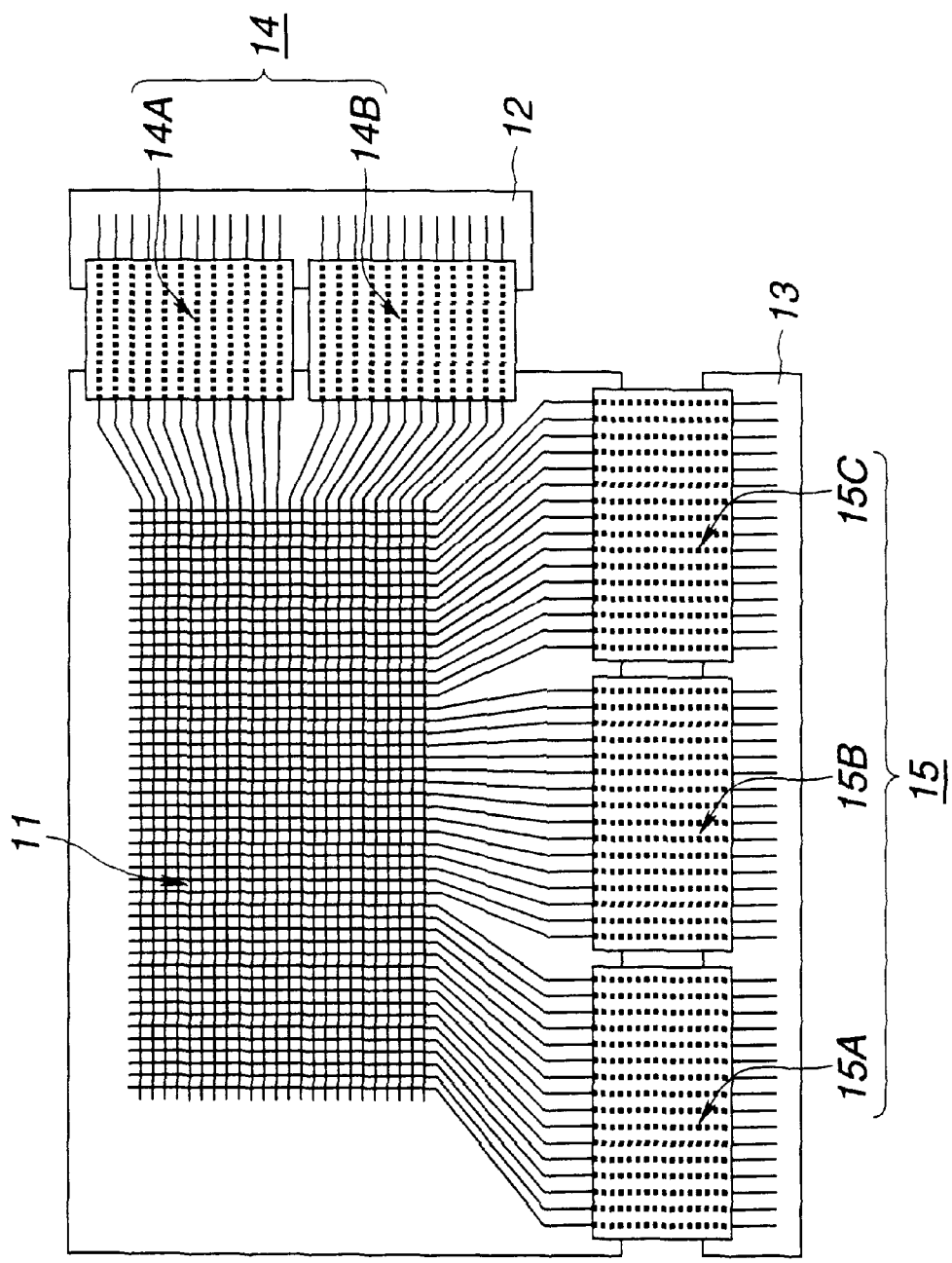
FIG. 2 is a block diagram showing another configuration of the conventional image display apparatus.

For example, with reference to an enlarged view of the signal transmitting section 4 shown in FIG.4, a transmitting line 41 and a transmitting line 43 are adjacent to each other in the image display apparatus 1. However, the transmitting block including the transmitting line 41 and the transmitting block including the transmitting line 43 are different from each other. The transmitting line 42 is the dummy transmitting line that is not used in the image display section 1, and is electrically connected to the transmitting line 41 outside of the signal transmitting section 4. Then, a distance between the dummy transmitting line 42 disposed on the signal transmitting section 4 and the normal transmitting line 43 is made equal to an interval between the transmitting lines in the respective transmitting blocks in which the transmitting line 41 and the transmitting line 43 are placed.

As constructed above, the capacitance generated between the transmitting line 41 and the transmitting line 43 is equal to that generated between the transmitting lines of the respective transmitting blocks.

As a result, in this image display apparatus, the capacitances between the respective transmitting lines of the signal transmitting sections 4, 5 in which a plurality of transmitting lines are brought into the single element for each plurality of transmitting blocks can be made uniform. Therefore, it is possible to display the image with the high quality without the vertical or horizontal noise on the image. Moreover, since the signal transmitting sections 4, 5 are divided into a plurality of transmitting blocks, it is possible for each transmitting block to thereby improve the production yield.

What is claimed is:

1. An image display apparatus, comprising:
   an image display section to which an independent signal for each independent pixel and line is applied;
   a vertical drive signal generating section for generating a vertical drive image signal;
   a horizontal drive signal generating section for generating a horizontal drive image signal;
   a vertical drive signal transmitting section for transmitting said vertical drive image signal generated by said vertical drive signal generating section to said image display section;
   a horizontal drive signal transmitting section for transmitting said horizontal drive image signal generated by said horizontal drive signal generating section to said image display section, wherein said horizontal and vertical drive signal transmitting sections are divided into a plurality of transmitting blocks having disposed thereon a plurality of parallel transmitting lines including a dummy transmitting line disposed on one of said plurality of transmitting blocks, said dummy transmitting line being electrically connected to a transmitting line on an adjacent block nearest to said one of said plurality of transmitting blocks. thereby a capacitance between any two of said plurality of parallel transmitting lines is made equal.

2. The image display apparatus according to claim 1, wherein said image display section is composed of a display panel formed of one of a liquid crystal display and a plasma display.

3. The image display apparatus according to claim 1, wherein each of said horizontal and vertical drive signal transmitting sections transmits in parallel said horizontal and vertical drive image signals, respectively, for each of said independent pixels or lines in said image display section using said plurality of parallel transmitting lines, and said plurality of parallel transmitting lines are evenly spaced in each of said plurality of transmitting blocks.

4. The image display apparatus according to claim 3, wherein said transmitting blocks in each of said horizontal and vertical drive signal transmitting sections are constituted by a flexible printed circuit board.

* * * * *